United States Patent
Kageyama et al.

(10) Patent No.: US 11,041,062 B2
(45) Date of Patent: *Jun. 22, 2021

(54) RUBBER COMPOSITION AND PNEUMATIC TIRE

(71) Applicant: The Yokohama Rubber Co., LTD., Tokyo (JP)

(72) Inventors: Hirokazu Kageyama, Hiratsuka (JP); Kazushi Kimura, Hiratsuka (JP)

(73) Assignee: The Yokohama Rubber Co., LTD.

( * ) Notice: Subject to any disclaimer, the term of this patent is extended or adjusted under 35 U.S.C. 154(b) by 68 days.

This patent is subject to a terminal disclaimer.

(21) Appl. No.: 16/475,050

(22) PCT Filed: Dec. 26, 2017

(86) PCT No.: PCT/JP2017/046663
§ 371 (c)(1),
(2) Date: Jun. 28, 2019

(87) PCT Pub. No.: WO2018/124078
PCT Pub. Date: Jul. 5, 2018

(65) Prior Publication Data
US 2019/0330448 A1    Oct. 31, 2019

(30) Foreign Application Priority Data

Dec. 28, 2016    (JP) .............................. JP2016-255983
Mar. 3, 2017    (JP) .............................. JP2017-040613

(51) Int. Cl.
*C08K 5/3462*    (2006.01)
*B60C 1/00*    (2006.01)
(Continued)

(52) U.S. Cl.
CPC .............. *C08K 5/3462* (2013.01); *B60C 1/00* (2013.01); *B60C 1/0016* (2013.01);
(Continued)

(58) Field of Classification Search
CPC ................................ B60C 1/00; C08K 5/3462
See application file for complete search history.

(56) References Cited

U.S. PATENT DOCUMENTS

| 6,518,350 B1 | 2/2003 | Kobayashi et al. |
| 2014/0364560 A1 | 12/2014 | Backer et al. |
| 2017/0022298 A1 | 1/2017 | Sohn et al. |

FOREIGN PATENT DOCUMENTS

| EP | 3 101 036 | 12/2016 |
| JP | 2001-106830 | 4/2001 |

(Continued)

OTHER PUBLICATIONS

English Machine Translation for JP2012153785 (A) Obtained Oct. 30, 2020 at https://worldwide.espacenet.com/publicationDetails/biblio?CC=JP&NR=2012153785A&KC=A&FT=D&ND=3&date=20120816&DB=EPODOC&locale=en_EP#.*

(Continued)

*Primary Examiner* — Arrie L Reuther
(74) *Attorney, Agent, or Firm* — Thorpe North & Western

(57) ABSTRACT

A rubber composition of the present technology includes: a diene rubber; silica; and a heterocyclic compound (the heterocyclic compound does not have a silicon atom) which includes a hydrocarbon group having from 3 to 30 carbons and at least one type of heterocycle selected from the group consisting of a piperazine ring, a morpholine ring and a thiomorpholine ring, and a content of the silica being from 50 to 200 parts by mass per 100 parts by mass of the diene rubber and a content of the heterocyclic compound being from 0.5 to 20% by mass with respect to the content of the silica.

5 Claims, 1 Drawing Sheet

(51) Int. Cl.
 *C08K 3/36* (2006.01)
 *C08K 5/357* (2006.01)
 *C08L 9/06* (2006.01)
(52) U.S. Cl.
 CPC .............. *B60C 1/0025* (2013.01); *C08K 3/36* (2013.01); *C08K 5/357* (2013.01); *C08L 9/06* (2013.01); *B60C 2001/0058* (2013.01); *C08L 2205/02* (2013.01)

(56) References Cited

FOREIGN PATENT DOCUMENTS

| | | |
|---|---|---|
| JP | 2009-040915 | 2/2009 |
| JP | 2011-122123 | 6/2011 |
| JP | 2012-153785 | 8/2012 |
| JP | 2013-035964 | 2/2013 |
| JP | 2015-502357 | 1/2015 |
| WO | WO 2013/083749 | 6/2013 |

OTHER PUBLICATIONS

International Search Report for International Application No. PCT/JP2017/046663 dated Apr. 3, 2018, 3 pages, Japan.

\* cited by examiner

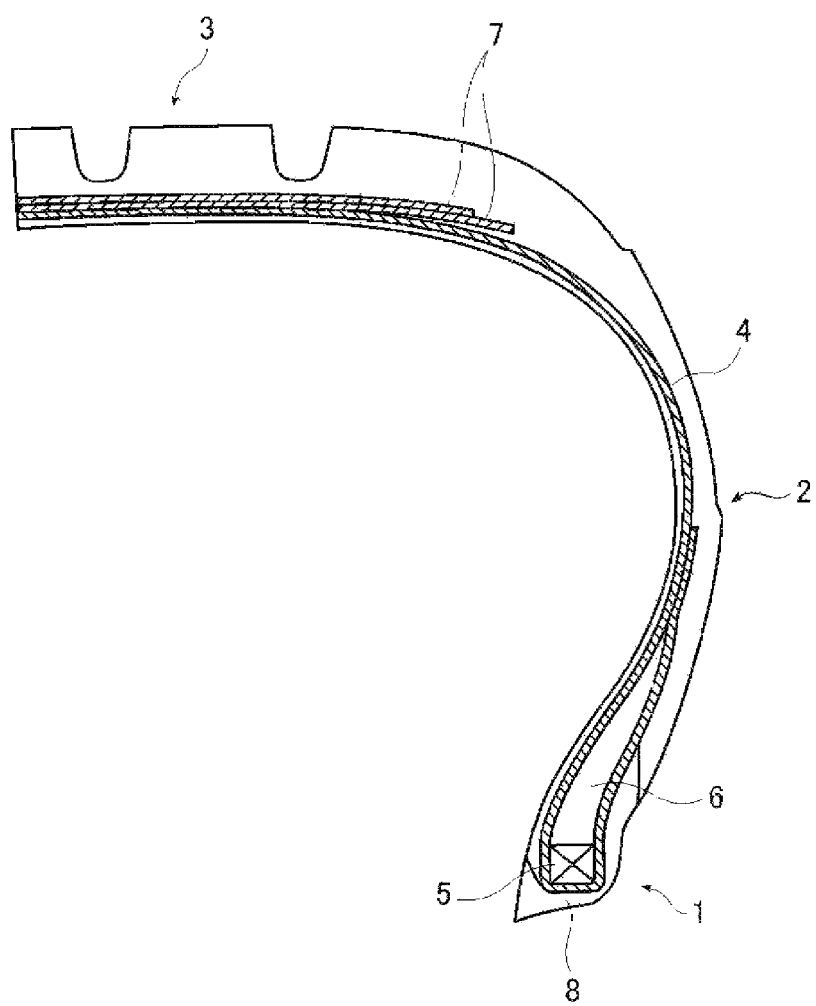

RUBBER COMPOSITION AND PNEUMATIC TIRE

TECHNICAL FIELD

The present technology relates to a rubber composition and a pneumatic tire.

BACKGROUND ART

In the related art, silica has been widely used in rubber compositions used in a tire in order to reduce a rolling resistance of the tire. Particles of the silica are more likely to aggregate with each other, and a dispersion of the silica in rubber is generally difficult. To improve the dispersibility of the silica, a method for adding a sulfur-containing silane coupling agent has been known.

For example, Japan Unexamined Patent Publication No. 2015-502357 discloses a diene elastomer composition including a diene elastomer, a hydrolysable silane, and a curing agent for the diene elastomer, in which the hydrolysable silane has a particular structure.

The present inventors have found, by referring to Japan Unexamined Patent Publication No. 2015-502357, that as a result of preparing a rubber composition containing a hydrolysable silane having a piperazine ring and evaluating the prepared rubber composition, such a composition has a high Mooney viscosity and cannot prevent scorch (burning of unvulcanized rubber), and may have low workability.

SUMMARY

The present technology provides a rubber composition which has superior workability (for example, Mooney viscosity and Mooney scorch is in a suitable range).

A rubber composition including: a diene rubber; silica; and a heterocyclic compound (where, the heterocyclic compound does not have a silicon atom) which includes a hydrocarbon group having from 3 to 30 carbons and at least one type of heterocycle selected from the group consisting of a piperazine ring, a morpholine ring, and a thiomorpholine ring, and a content of the silica being from 50 to 200 parts by mass per 100 parts by mass of the diene rubber and a content of the heterocyclic compound being from 0.5 to 20% by mass with respect to the content of the silica provides desired effects.

The present technology provides the following features.

1. A rubber composition includes: a diene rubber; silica; and a heterocyclic compound (where, the heterocyclic compound does not have a silicon atom) which includes a hydrocarbon group having from 3 to 30 carbons and at least one type of heterocycle selected from the group consisting of a piperazine ring, a morpholine ring, and a thiomorpholine ring, and a content of the silica being from 50 to 200 parts by mass per 100 parts by mass of the diene rubber, and a content of the heterocyclic compound being from 0.5 to 20% by mass with respect to the content of the silica.

2. The rubber composition according to 1 above, wherein the heterocyclic compound is represented by Formula (I).

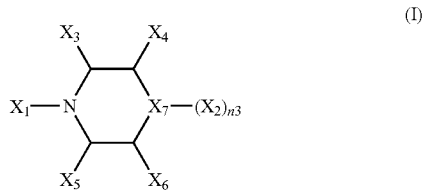

(I)

In Formula (I), $X_7$ represents a nitrogen atom, an oxygen atom or a sulfur atom, $X_3$, $X_4$, $X_5$, and $X_6$ each independently represent a hydrogen atom or a hydrocarbon group.

When $X_7$ is a nitrogen atom, n3 is 1, and one or both of $X_1$ and $X_2$ each independently represent Formula (I-1): -$(A_1)_{n1-1}$-$R_{1-1}$, when only one of $X_1$ and $X_2$ represents Formula (I-1), the remaining groups represent at least one type selected from the group consisting of a hydrogen atom, a sulfone-based protecting group, a carbamate-based protecting group, and Formula (I-3): —$(R_2$—$O)_{n2}$—H, in Formula (I-3), $R_2$ each independently represents a divalent hydrocarbon group, and n2 represents from 1 to 10.

When $X_7$ is an oxygen atom or a sulfur atom, n3 represents 0, and $X_1$ represents Formula (I-1): -$(A_1)_{n1-1}$-$R_{1-1}$, In Formula (I-1), $A_1$ represents a carbonyl group and/or Formula (I-2): —$R_{1-2}(OH)$—O—, n1-1 represents 0 or 1, $R_{1-1}$ represents the hydrocarbon group having from 3 to 30 carbons, and in Formula (I-2), $R_{1-2}$ represents a trivalent hydrocarbon group.

3. The rubber composition according to 2 above, wherein the heterocyclic compound is a compound represented by Formula (I), where $X_7$ is a nitrogen atom, and n3 is 1, and both of $X_1$ and $X_2$ each independently represent Formula (I-1).

4. The rubber composition according to 2 above, wherein the heterocyclic compound is a compound represented by Formula (I), where $X_7$ is a nitrogen atom, and n3 is 1, only one of $X_1$ and $X_2$ represents Formula (I-1), the remaining groups represent at least one type selected from the group consisting of a hydrogen atom, a sulfone-based protecting group, a carbamate-based protecting group, and Formula (I-3): —$(R_2$—$O)_{n2}$—H. In Formula (I-3), $R_2$ each independently represents a divalent hydrocarbon group, and n2 represents from 1 to 10.

5. The rubber composition according to 2 above, wherein the heterocyclic compound is a compound represented by Formula (I), where $X_7$ is an oxygen atom or a sulfur atom, n3 is 0, and $X_1$ represents Formula (I-1).

6. A pneumatic tire including the rubber composition described in any one of 1 to 5 above.

The rubber composition of the present technology has the superior workability.

In addition, the present technology can provide the pneumatic tire.

BRIEF DESCRIPTION OF DRAWINGS

FIG. 1 is a schematic partial cross-sectional view of a tire that represents a pneumatic tire according to an embodiment of the present technology.

DETAILED DESCRIPTION

Embodiments of the present technology are described in detail below.

In the present specification, a numerical range indicated by "to . . . from" means a range including numerical values described before and after "to" as a lower limit value and an upper limit value, respectively.

In the present specification, unless otherwise noted, a single corresponding substance may be used for each component, or a combination of two or more types of corresponding substances may be used for each component. When a component contains two or more types of substances, the content of the component means the total content of the two or more types of substances.

Rubber Composition

A rubber composition according to an embodiment of the preset technology includes: a diene rubber; silica; and a heterocyclic compound (where, the heterocyclic compound does not have a silicon atom) which includes a hydrocarbon group having 3 to 30 carbons and at least one type of heterocycle selected from the group consisting of a piperazine ring, a morpholine ring, and a thiomorpholine ring, in which a content of the silica is from 50 to 200 parts by mass per 100 parts by mass of the diene rubber, and a content of the heterocyclic compound is from 0.5 to 20% by mass with respect to the content of the silica.

In the composition according to an embodiment of the present technology, the heterocyclic compound does not have a silicon atom.

The composition according to an embodiment of the present technology is thought to achieve desired effects as a result of having such a configuration. Although the reason is not clear, it is assumed to be as follows.

The heterocyclic compound included in the composition according to an embodiment of the present technology has a hydrocarbon group having from 3 to 30 carbons and at least one type of heterocycle selected from the group consisting of a piperazine ring, a morpholine ring, and a thiomorpholine ring.

It is considered that the hydrocarbon group easily interacts with the diene rubber because of having hydrophobicity, and the heterocycle easily interacts with silica because of having hydrophilicity.

Thus, the heterocyclic compound which has the hydrocarbon group as a hydrophobic part and the heterocycle as a hydrophilic part functions like a surfactant in the composition containing the diene rubber and the silica to increase dispersibility of the silica in a diene rubber. In light of this, the present inventors estimate that Mooney viscosity in an unvulcanized rubber is lowered.

Further, the heterocyclic compound does not form a chemical bond although interacting with the diene rubber in the hydrocarbon group, and the heterocyclic compound interacts with the silica in the heterocycle but does not have a silicon atom. It is therefore considered that the heterocyclic compound does not form the chemical bond with the silica. For this reason, the present inventors estimate that the heterocyclic compound does not increase a vulcanization accelerating effect and thus scorch (burning) is suppressed.

As described above, it is considered that the presence of the heterocyclic compound lowers the Mooney viscosity, thus suppressing the scorch, and therefore the composition according to an embodiment of the present technology has superior workability.

Each of the components included in the composition according to an embodiment of the present technology will be described in detail below.

Diene Rubber

The diene rubber included in the composition according to an embodiment of the present technology is not particularly limited.

Examples of the diene rubber include a natural rubber (NR), a butadiene rubber, an isoprene rubber (IR), an aromatic vinyl-conjugated diene copolymer rubber such as a styrene butadiene rubber, an acrylonitrile-butadiene copolymer rubber (NBR), butyl rubber (IIR), a halogenated butyl rubber (Br—IIR and Cl—IIR), and a chloroprene rubber (CR).

Among those, from the perspective of superior low heat buildup and strength characteristics, at least one type selected from the group consisting of the aromatic vinyl-conjugated diene copolymer rubber and the butadiene rubber is preferable.

The weight average molecular weight of the diene rubber can be, for example, from 100000 to 3000000. In an embodiment of the present technology, the weight average molecular weight (Mw) of the diene rubber is measured in terms of polystyrene standard by gel permeation chromatography (GPC) using tetrahydrofuran as a solvent.

A method for producing a diene rubber is not particularly limited. Examples thereof include known products.

Silica

The silica included in the composition according to an embodiment of the present technology is not particularly limited. For example, any known silica blended in the rubber composition for applications such as a tire can be used.

Specific examples of the silica include fumed silica, calcined silica, precipitated silica, pulverized silica, fused silica, and colloidal silica.

The BET (Brunauer-Emmett-Teller) specific surface area of the silica is preferably from 150 to 300 $m^2/g$, from the perspective of being superior in low heat buildup. The BET specific surface area of the silica is to be measured in accordance with a Brunauer-Emmett-Teller method corresponding to Annex D of ISO (International Standards Organisation) 5794/1.

A method for producing silica is not particularly limited. Examples thereof include known products.

Content of Silica

In an embodiment of the present technology, the content of the silica is from 50 to 200 parts by mass per 100 parts by mass of the diene rubber.

The content of the silica is preferably from 70 to 150 parts by mass per 100 parts by mass of the diene rubber from the perspective of being superior in low heat buildup.

Heterocyclic Compound

The heterocyclic compound included in the composition according to an embodiment of the present technology has a hydrocarbon group having from 3 to 30 carbons and at least one type of heterocycle selected from the group consisting of a piperazine ring, a morpholine ring, and a thiomorpholine ring. In an embodiment of the present technology, the heterocyclic compound does not have a silicon atom.

The hydrocarbon group having from 3 to 30 carbons can function as a hydrophobic part.

The heterocyclic compound can be a compound which does not have an enamine structure (N—C=C).

Hydrocarbon group having from 3 to 30 carbons

Examples of the hydrocarbon group having from 3 to 30 carbons include an aliphatic hydrocarbon group (including linear, branched, and alicyclic types), an aromatic hydrocarbon group, and a combination thereof.

Among those, from the perspective of being more superior in workability, the aliphatic hydrocarbon group is preferable, and a saturated aliphatic hydrocarbon group is more preferable.

The number of carbons of the hydrocarbon group having from 3 to 30 carbons is preferably from 8 to 22 from the perspective of being more superior in workability.

According to one of the preferred aspects, examples of the hydrocarbon group having from 3 to 30 carbons include one consisting of only a carbon atom and a hydrogen atom.

According to one of the preferred aspects, the hydrocarbon group having from 3 to 30 carbons is monovalent.

One molecule of the heterocyclic compound can have one or more of the hydrocarbon groups having from 3 to 30 carbons, and according to one of the preferred aspects, the heterocyclic compound has one or two of the hydrocarbon groups.

Heterocycle

In an embodiment of the present technology, the heterocyclic compound has at least one type of heterocycle selected from the group consisting of the piperazine ring, the morpholine ring, and the thiomorpholine ring.

All the heterocycles (piperazine ring, morpholine ring, and thiomorpholine ring) are a six-membered ring.

One molecule of the heterocyclic compound can have one or more of the heterocycles, and according to one of the preferred aspects, the heterocyclic compound have one heterocycle.

When the heterocyclic compound has one heterocycle per molecule, the one heterocycle is the piperazine ring, the morpholine ring, or the thiomorpholine ring.

From the perspective of being more superior in workability, the heterocycle is preferably the piperazine ring and the morpholine ring, and more preferably the piperazine ring.

Piperazine Ring

The piperazine ring means a skeleton of piperazine. The heterocyclic compound which has the piperazine ring as the heterocycle may be hereafter called a "piperazine compound". In an embodiment of the present technology, the piperazine ring does not include a triethylenediamine skeleton.

Morpholine Ring

The morpholine ring means a skeleton of morpholine. The heterocyclic compound which has the morpholine ring as the heterocycle may be hereafter called a "morpholine compound".

Thiomorpholine Ring

The thiomorpholine ring means a skeleton of thiomorpholine. The heterocyclic compound which has the thiomorpholine ring as the heterocycle may be hereafter called a "thiomorpholine compound".

Bonding of heterocycle to hydrocarbon group having from 3 to 30 carbons

The hydrocarbon group having from 3 to 30 carbons can be bonded to a nitrogen atom or a carbon atom of the heterocycle of the heterocyclic compound directly or via an organic group.

According to one of the preferred aspects, the hydrocarbon group having from 3 to 30 carbons is bonded to the nitrogen atom of the heterocycle of the heterocyclic compound directly or via the organic group.

In the heterocyclic compound, when the heterocycle is the morpholine ring, the hydrocarbon group having from 3 to 30 carbons can be bonded to a nitrogen atom or a carbon atom in the morpholine ring directly or via the organic group. The same goes for the case where the heterocycle is the thiomorpholine ring.

The organic group is not particularly limited. Examples of the organic group include a hydrocarbon group having an oxygen atom. Examples of the hydrocarbon group include the same one as the above.

The oxygen atom may form, for example, a carbonyl group or a hydroxy group.

When the organic group is the hydrocarbon group having an oxygen atom at a terminal thereof, the oxygen atom may be bonded to the hydrocarbon group having from 3 to 30 carbons to form an ether bond. The hydrocarbon group having an oxygen atom may further have a hydroxy group.

The piperazine compound can further have the hydrocarbon group having from 3 to 30 carbons and a substituent other than the piperazine ring. Examples of the substituent include at least one type selected from the group consisting of a sulfone-based protecting group, a carbamate-based protecting group, and Formula (I-3): —$(R_2—O)_{n2}$—H.

When the piperazine compound further has the substituent, the substituent can be bonded to a nitrogen atom of the piperazine ring of the piperazine compound.

In addition, in the piperazine compound, one hydrocarbon group having from 3 to 30 carbons is bonded to one of two nitrogen atoms of the piperazine ring, and the remaining nitrogen atom of the piperazine ring can be bonded to the hydrogen atom or the substituent.

Sulfone-Based Protecting Group

Examples of the sulfone-based protecting group include a methanesulfonyl group, a tosyl group, and a nosyl group.

Carbamate-Based Protecting Group

Examples of the carbamate-based protecting group include a tert-butoxycarbonyl group, an allyloxycarbonyl group, a benzyloxycarbonyl group, and a 9-fluorenylmethyloxycarbonyl group.

Formula (I-3)

In Formula (I-3): —$(R_2—O)_{n2}$—H, $R_2$ each independently represents a divalent hydrocarbon group.

In Formula (I-3), the number of carbons of the divalent hydrocarbon group is preferably 2 and 3.

The divalent hydrocarbon group is preferably an aliphatic hydrocarbon group. The aliphatic hydrocarbon group may be linear, branched, cyclic types or any combination thereof.

$n2$ represents from 1 to 10, and is preferably from 1 to 5.

From the perspective of being superior in workability and superior in dispersibility of silica, the heterocyclic compound is preferably a compound represented by the following Formula (I).

In addition, the ring structure (heterocycle constituted by N (nitrogen atom), four carbons, and $X_7$) represented by the following Formula (I) is a six-membered ring. The number of ring structures is one per molecule of the compound represented by Formula (I).

When $X_7$ in Formula (I) is a nitrogen atom, the heterocycle represented by Formula (I) corresponds to the piperazine ring.

When $X_7$ in Formula (I) is an oxygen atom, the heterocycle represented by Formula (I) corresponds to the morpholine ring.

When $X_7$ in Formula (I) is a sulfur atom, the heterocycle represented by Formula (I) corresponds to the thiomorpholine ring.

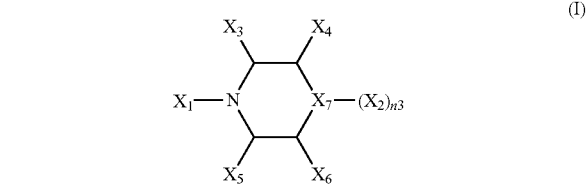

(I)

In Formula (I), $X_7$ represents a nitrogen atom, an oxygen atom or a sulfur atom, $X_3$, $X_4$, $X_5$, and $X_6$ each independently represent a hydrogen atom or a hydrocarbon group.

When $X_7$ is a nitrogen atom, n3 is 1, and one or both of $X_1$ and $X_2$ each independently represent Formula (I-1): $-(A_1)_{n1-1}\text{-}R_{1-1}$, when only one of $X_1$ and $X_2$ represents Formula (I-1), the remaining groups represent at least one type selected from the group consisting of a hydrogen atom, a sulfone-based protecting group, a carbamate-based protecting group, and Formula (I-3): $—(R_2—O)_{n2}—H$, in Formula (I-3), $R_2$ each independently represents a divalent hydrocarbon group, and n2 represents from 1 to 10.

When $X_7$ is an oxygen atom or a sulfur atom, n3 represents 0, and $X_1$ represents Formula (I-1): $-(A_1)_{n1-1}\text{-}R_{1-1}$.

In Formula (I-1), $A_1$ represents a carbonyl group and/or Formula (I-2): $—R_{1-2}(OH)—O—$, n1-1 represents 0 or 1, $R_{1-1}$ represents the hydrocarbon group having from 3 to 30 carbons, and in Formula (I-2), $R_{1-2}$ represents a trivalent hydrocarbon group.

In Formula (I), one or both of $X_1$ and $X_2$ each independently represent Formula (I-1): $-(A_1)_{n1-1}\text{-}R_{1-1}$.

Formula (I-1)

In Formula (I-1): $-(A_1)_{n1-1}\text{-}R_{1-1}$, $A_1$ represents a carbonyl group and/or Formula (I-2): $—R_{1-2}(OH)—O—$.

n1-1 represents 0 or 1.

$R_{1-1}$ represents the hydrocarbon group having from 3 to 30 carbons. The hydrocarbon group having from 3 to 30 carbons is the same as above.

Formula (I-2)

In Formula (I-2): $—R_{1-2}(OH)—O—$, $R_{1-2}$ represents a trivalent hydrocarbon group.

The number of carbon atoms of the trivalent hydrocarbon group is preferably from 3 to 30.

The trivalent hydrocarbon group is preferably an aliphatic hydrocarbon group. The aliphatic hydrocarbon group may be linear, branched, cyclic types or any combination thereof.

In Formula (I-2), the hydroxy group and the oxygen atom (—O—) may be bonded to any carbon atom constituting $R_{1-2}$.

In Formula (I-1), when n1-1 is 1 and $A_1$ is Formula (I-2), $R_{1-2}$ in Formula (I-2) is bonded to the piperazine ring, and according to one of the preferred aspects, the oxygen atom (—O—) in Formula (I-2) is bonded to $R_{1-1}$, ($X_3$, $X_4$, $X_5$, and $X_6$)

In Formula (I), $X_3$, $X_4$, $X_5$, and $X_6$ each independently represent a hydrogen atom or a hydrocarbon group.

The hydrocarbon group is not particularly limited. The hydrocarbon group may be a hydrocarbon group having from 3 to 30 carbons, or may be any other hydrocarbon group.

According to one of the preferred aspects, $X_3$, $X_4$, $X_5$, and $X_6$ each are a hydrogen atom.

In Formula (I), when $X_7$ is a nitrogen atom, n3 is 1, and only one of $X_1$ and $X_2$ represents Formula (I-1), the remaining groups can represent at least one type selected from the group consisting of a hydrogen atom, a sulfone-based protecting group, a carbamate-based protecting group, and Formula (I-3): $—(R_2—O)_{n2}—H$.

That is, when $X_1$ represents Formula (I-1), $X_2$ represents at least one type selected from the group consisting of a hydrogen atom, a sulfone-based protecting group, a carbamate-based protecting group, and Formula (I-3): $—(R_2—O)_{n2}—H$.

In addition, when $X_2$ represents Formula (I-1), $X_1$ represents at least one type selected from the group consisting of a hydrogen atom, a sulfone-based protecting group, a carbamate-based protecting group, and Formula (I-3): $—(R_2—O)_{n2}—H$. The sulfone-based protecting group, the carbamate-based protecting group and Formula (I-3) each are the same as those described above. When the heterocyclic compound is a compound represented by Formula (I), $X_7$ is a nitrogen atom, and n3 is 1

The heterocyclic compound which is represented by Formula (I), where $X_7$ is a nitrogen atom and n3 is 1 is represented by the following Formula (II).

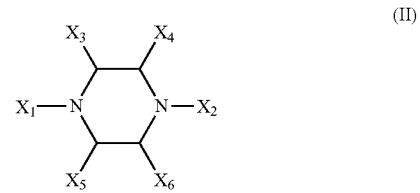

(II)

In Formula (II), one or both of $X_1$ and $X_2$ each independently represent Formula (I-1): $-(A_1)_{n1-1}\text{-}R_{1-1}$.

Formula (I-1)

In Formula (I-1): $-(A_1)_{n1-1}\text{-}R_{1-1}$, $A_1$ represents a carbonyl group and/or Formula (I-2): $—R_{1-2}(OH)—O—$.

n1-1 represents 0 or 1.

$R_{1-1}$ represents the hydrocarbon group having from 3 to 30 carbons. The hydrocarbon group having from 3 to 30 carbons is the same as above.

Formula (I-2)

In Formula (I-2): $—R_{1-2}(OH)—O—$, $R_{1-2}$ represents a trivalent hydrocarbon group.

The number of carbon atoms of the trivalent hydrocarbon group is preferably from 3 to 30.

The trivalent hydrocarbon group is preferably an aliphatic hydrocarbon group. The aliphatic hydrocarbon group may be linear, branched, cyclic types or any combination thereof.

In Formula (I-2), the hydroxy group and the oxygen atom (—O—) may be bonded to any carbon atom constituting $R_{1-2}$.

In Formula (I-1), when n1-1 is 1 and $A_1$ is Formula (I-2), $R_{1-2}$ in Formula (I-2) is bonded to the piperazine ring, and according to one of the preferred aspects, the oxygen atom (—O—) in Formula (I-2) is bonded to $X_3$, $X_4$, $X_5$, and $X_6$ In Formula (II), $X_3$, $X_4$, $X_5$, and $X_6$ each independently represent a hydrogen atom or a hydrocarbon group.

The hydrocarbon group is not particularly limited. The hydrocarbon group may be a hydrocarbon group having from 3 to 30 carbons, or may be any other hydrocarbon group.

According to one of the preferred aspects, $X_3$, $X_4$, $X_5$, and $X_6$ each are a hydrogen atom.

In Formula (II), when only one of $X_1$ and $X_2$ represents Formula (I-1), the remaining groups can represent at least one type selected from the group consisting of a hydrogen atom, a sulfone-based protecting group, a carbamate-based protecting group, and Formula (I-3): $—(R_2—O)_{n2}—H$.

That is, when $X_1$ represents Formula (I-1), $X_2$ represents at least one type selected from the group consisting of a hydrogen atom, a sulfone-based protecting group, a carbamate-based protecting group, and Formula (I-3): $—(R_2—O)_{n2}—H$.

In addition, when $X_2$ represents Formula (I-1), $X_1$ represents at least one type selected from the group consisting of a hydrogen atom, a sulfone-based protecting group, a carbamate-based protecting group, and Formula (I-3): —(R$_2$—O)$_{n2}$—H. The sulfone-based protecting group, the carbamate-based protecting group and Formula (I-3) each are the same as those described above.

Examples of a specific aspect of the piperazine compound include the following aspect 1 or 2.

Aspect 1 of Piperazine Compound

Aspect 1 of the piperazine compound is represented by Formula (II), and both of X$_1$ and X$_2$ each independently represent a compound represented by Formula (I-1).

In the aspect 1, X$_3$, X$_4$, X$_5$, and X$_6$ are preferably a hydrogen atom.

Specific examples of the aspect 1 include piperazine compounds 3, 5 and 8 represented by the following Formula.

Piperazine compound 3

Piperazine compound 5

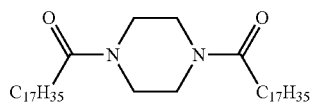

The piperazine compound 8 (R each independently represents —C$_{12}$H$_{25}$ or —C$_{13}$H$_{27}$)

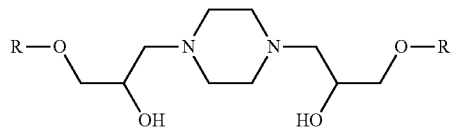

Aspect 2 of Piperazine Compound

The aspect 2 of the piperazine compound is a compound which is represented by Formula (II), where only one of X$_1$ and X$_2$ represents Formula (I-1) and the remaining groups can represent at least one type selected from the group consisting of a hydrogen atom, a sulfone-based protecting group, a carbamate-based protecting group, and Formula (I-3): —(R$_2$—O)$_{n2}$—H.

In the aspect 2, X$_3$, X$_4$, X$_5$, and X$_6$ are preferably a hydrogen atom.

Specific examples of the aspect 2 include piperazine compounds 1, 2, 4, 6, and 7 represented by the following Formula.

Piperazine compound 1

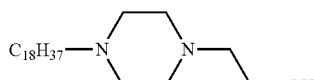

The piperazine compound 2 (in the following structural Formula, n is 1 to 10, and preferably 1 to 5)

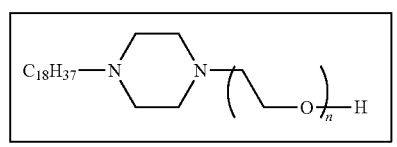

Piperazine compound 4

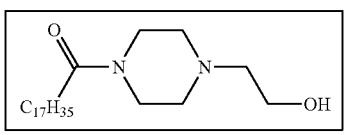

Piperazine compound 6

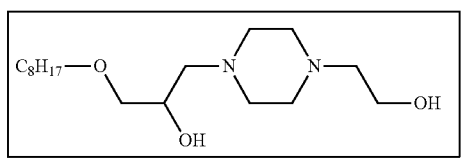

The piperazine compound 7 (R each independently represents —C$_{12}$H$_{25}$ or —C$_{13}$H$_{27}$. The piperazine compound 7 may also be a mixture of the piperazine compound in which R is —C$_{12}$H$_{25}$ and the piperazine compound in which R is —C$_{13}$H$_{27}$)

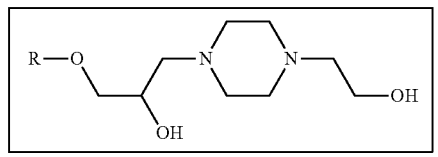

When the heterocyclic compound is a compound represented by Formula (I), X$_7$ is an oxygen atom or a sulfur atom, and n3 is 0

The heterocyclic compound which is represented by Formula (I), where X$_7$ is an oxygen atom or a sulfur atom, and n3 is 0 is represented by the following Formula (III).

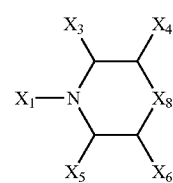

(III)

In Formula (III), X$_1$ is the same as Formula (I-1) of Formula (I): -(A$_1$)$_{n1-1}$-R$_{1-1}$, X$_3$, X$_4$, X$_5$, and X$_6$ are the same as X$_3$, X$_4$, X$_5$, and X$_6$ of Formula (I), respectively, and X$_8$ is an oxygen atom or a sulfur atom.

Examples of the compound represented by Formula (III) include morpholine compounds 1 to 4 represented by the following Formula.

Morpholine compound 1

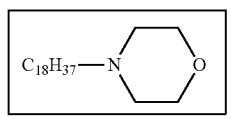

-continued

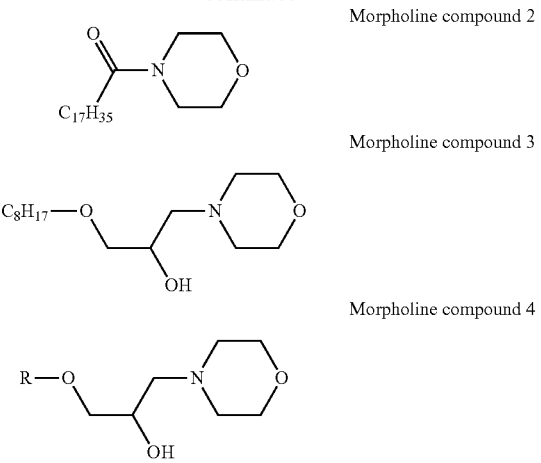

Morpholine compound 2

Morpholine compound 3

Morpholine compound 4

(The morpholine compound 4 is a mixture of the morpholine compound in which R is —$C_{12}H_{25}$ and the morpholine compound in which R is —$C_{13}H_{27}$)

A method for producing a heterocyclic compound is not particularly limited. Examples thereof include known products.

Specifically, for example, the hydrocarbon compound having from 3 to 30 carbons which has at least one type selected from the group consisting of piperazine, morpholine, and thiomorpholine which may have a substituent and at least one type selected from the group consisting of a halogen atom (chlorine, bromine, iodine, or the like), an acid halogen group (acid chloride group, acid bromide group, and acid iodide group, or the like), and a glycidyloxy group is reacted in a solvent as needed, thereby obtaining the heterocyclic compound. The substituent is the same as above. The hydrocarbon group having from 3 to 30 carbons of the hydrocarbon compound is the same as above.

In addition, examples of the method for producing a piperazine compound having Formula (I-3): —($R_2$—O)$_{n2}$—H as in the piperazine compound 2 include a method for reacting a piperazine compound having a hydroxy group as in the piperazine compound 1 with an alkylene oxide in the presence of a metal alkoxide.

Content of Heterocyclic Compound

In an embodiment of the present technology, the content of the heterocyclic compound is from 0.5 to 20% by mass with respect to the content of the silica.

The content of the heterocyclic compound is preferably from 1 to 15% by mass, and more preferably from 1 to 10% by mass with respect to the content of the silica, from the perspective of being superior in workability and dispersibility of the silica.

Silane Coupling Agent

According to one of the preferred aspects, the composition according to an embodiment of the present technology further includes the silane coupling agent from the perspective of being superior in the dispersibility of the silica.

The silane coupling agent which the composition according to an embodiment of the present technology can further contain is not particularly limited.

Examples of the silane coupling agent include silane coupling agents containing a sulfur atom such as mercaptosilane and sulfide silane.

Examples of the mercaptosilane include silane coupling agents having a mercapto group such as [$C_{13}H_{27}$O—($CH_2CH_2O)_5]_2(CH_3CH_2O)Si(CH_2)_2SH$, 3-mercaptopropyltrimethoxysilane and 3-mercaptopropyltriethoxysilane.

Examples of the sulfide silane include silane coupling agents having a (poly)sulfide bond such as bis (3-triethoxysilylpropyl) tetrasulfide, bis (2-triethoxysilylethyl) tetrasulfide, bis (3-trimethoxysilylpropyl) tetrasulfide, bis (2-trimethoxysilylethyl) tetrasulfide, bis (3-triethoxysilylpropyl) trisulfide, bis (3-trimethoxysilylpropyl) trisulfide, bis (3-triethoxysilylpropyl) disulfide, and bis (3-trimethoxysilylpropyl) disulfide.

A method for producing a silane coupling agent is not particularly limited. Examples thereof include known products.

The content of the silane coupling agent is preferably from 0.5 to 20% by mass and more preferably from 1 to 15% by mass with respect to the content of the silica, from the perspective of being superior in the dispersibility of the silica.

Additives

The rubber composition according to an embodiment of the present technology may contain an additive as necessary without damaging the effect or object of the present technology. Examples of the additive include rubbers other than diene rubber, fillers other than silica (for example, carbon black), a vulcanization accelerator, a resin, zinc oxide, a stearic acid, an anti-aging agent, a processing aid, oil, a vulcanizing agent such as sulfur, and those generally used in a rubber composition for a tire such as peroxide. The content of the additive can be appropriately selected.

Carbon Black

The composition according to an embodiment of the present technology preferably further contains carbon black.

The carbon black is not particularly limited. Examples of the carbon black include those of various grades such as super abrasion furnace (SAF, and so on)—high structure (HS, and so on), SAF, intermediate super abrasion furnace (ISAF, and so on)—HS, ISAF, ISAF-low structure (LS, and so on), an intermediate ISAF (IISAF)—HS, high abrasion furnace (HAF, and so on)—HS, HAF, HAF-LS, and fast extruding furnace (FEF).

The nitrogen adsorption specific surface area (N2SA) of the carbon black is preferably from 50 to 200 $m^2/g$ from the perspective of being superior in workability. The nitrogen adsorption specific surface area of the carbon black is measured in accordance with JIS (Japanese Industrial Standard) K 6217-2.

The content of the carbon black is preferably from 1 to 50 parts by mass and more preferably from 1 to 20 parts by mass per 100 parts by mass of the diene rubber.

Method for Producing Rubber Composition

The method for producing the rubber composition according to an embodiment of the present technology is not particularly limited. Specific examples thereof include a method for mixing each of the above-described components under conditions of from 100 to 200° C. using known methods and apparatuses (for example, a Banbury mixer, a kneader, a roll, and the like).

In addition, the rubber composition according to an embodiment of the present technology can be vulcanized or crosslinked, for example, under the known vulcanization or crosslinking conditions.

For example, a tire can be produced using the rubber composition according to an embodiment of the present technology.

Pneumatic Tire

The pneumatic tire according to an embodiment of the present technology is a pneumatic tire produced using the above-described rubber composition according to an embodiment of the present technology.

The constituent members of the pneumatic tire that can be made of the rubber composition are not particularly limited. Examples of the member include a tire tread, a sidewall, and a bead filler.

FIG. 1 is a schematic partial cross-sectional view of a tire that represents a pneumatic tire according to an embodiment of the present technology. The present technology is not limited to the accompanying drawings.

In FIG. 1, the pneumatic tire includes a bead portion 1, a sidewall portion 2, and a tire tread portion 3. A carcass layer 4 in which a fiber cord is embedded is mounted between a pair of left and right bead portions 1, and an end portion of the carcass layer 4 is folded outward from an inside of the tire around the bead core 5 and the bead filler 6 and rolled up. In the tire tread portion 3, a belt layer 7 is provided along the entire periphery of the tire on the outer side of the carcass layer 4. In the bead portion 1, a rim cushion 8 is disposed in a portion in contact with a rim.

The pneumatic tire according to an embodiment of the present technology can be produced, for example, in accordance with a known method. In addition, as a gas with which the pneumatic tire is filled, an inert gas such as nitrogen, argon, helium, or the like can be used in addition to a normal air or air whose oxygen partial pressure is adjusted.

EXAMPLE

The present technology is described below in detail using examples but the present technology is not limited to such examples.

Production of Heterocyclic Compound

Synthesis of Piperazine Compound 1

33.3 g of 1-bromooctadecane (available from Tokyo Chemical Industry Co., Ltd.) and 13.0 g of 1-(2-hydroxyethyl) piperazine (available from NIPPON NYUKAZAI CO., LTD. hydroxyethyl piperazine) were reacted in tetrahydrofuran and dichloromethane for 1 hour under conditions of room temperature. A reaction solution was washed with an aqueous potassium carbonate solution, extracted with dichloromethane, and dehydrated with anhydrous magnesium sulfate. An anhydrous magnesium sulfate was filtered off and concentrated to obtain piperazine compound 1 represented by the following Formula.

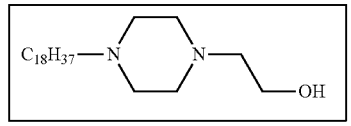

Piperazine compound 1

Synthesis of Piperazine Compound 2

39.6 g of the piperazine compound 1 obtained as described above, 13.2 g of ethylene oxide, and 0.004 g of sodium methoxide were reacted. The reaction solution was neutralized with phosphoric acid and filtered to obtain a piperazine compound 2 represented by the following Formula. n in the following Formula is 3.

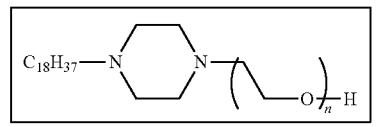

Piperazine compound 2

Synthesis of Piperazine Compound 3

66.6 g of 1-bromooctadecane (available from Tokyo Chemical Industry Co., Ltd.) and 19.04 g of piperazine hexahydrate (piperazine hexahydrate, available from NIPPON NYUKAZAI CO., LTD.) were reacted in tetrahydrofuran and dichloromethane for 1 hour under conditions of room temperature. A reaction solution was washed with an aqueous potassium carbonate solution, extracted with dichloromethane, and dehydrated with anhydrous magnesium sulfate. An anhydrous magnesium sulfate was filtered off and concentrated to obtain piperazine compound 3 represented by the following Formula.

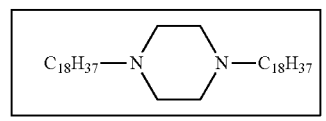

Piperazine compound 3

Synthesis of Piperazine Compound 4

30.3 g of stearoyl chloride (available from Tokyo Chemical Industry Co., Ltd.), 13.0 g of 1-(2-hydroxyethyl) piperazine (hydroxyethyl piperazine, available from NIPPON NYUKAZAI CO., LTD.), and 15.2 g of triethylamine were reacted in toluene for 1 hour under conditions of 0° C. A reaction solution was washed with an aqueous sodium carbonate solution, extracted with toluene, and dehydrated with anhydrous magnesium sulfate. An anhydrous magnesium sulfate was filtered off and concentrated to obtain piperazine compound 4 represented by the following Formula.

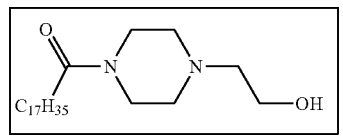

Piperazine compound 4

Synthesis of Piperazine Compound 5

60.6 g of stearoyl chloride (available from Tokyo Chemical Industry Co., Ltd.), 19.04 g of piperazine hexahydrate (piperazine hexahydrate, available from NIPPON NYUKAZAI CO., LTD.), and 30.4 g of triethylamine were reacted in toluene for 1 hour under conditions of 0° C. A reaction solution was washed with an aqueous sodium carbonate solution, extracted with toluene, and dehydrated with anhydrous magnesium sulfate. An anhydrous magnesium sulfate was filtered off and concentrated to obtain piperazine compound 5 represented by the following Formula.

Piperazine compound 5

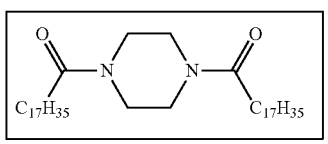

Synthesis of Piperazine Compound 6

18.5 g of 2-ethylhexyl glycidyl ether (Epogosey (trade name) 2EH, available from Yokkaichi Chemical Company, Limited.) and 13.0 g of 1-(2-hydroxyethyl) piperazine (hydroxyethyl piperazine, available from NIPPON NYUKAZAI CO., LTD.) were reacted for 4 hours in conditions of 60° C. to obtain a piperazine compound 6 represented by the following Formula.

The results of $^1$H-NMR of the piperazine compound 6 are as follows.

$^1$H-NMR (400 MHz, CDCl$_3$): δ 3.85 (m, 1H), 3.60 (t, 2H), 3.30-3.47 (m, 4H), 2.65 (m, 2H), 2.54 (t, 4H), 2.46 (t, 2H), 2.38 (dd, 2H), 1.52 (q, 1H), 1.26-1.41 (m, 8H), 0.89 (t, 5H), and 0.85 (s, 1H)

Piperazine compound 6

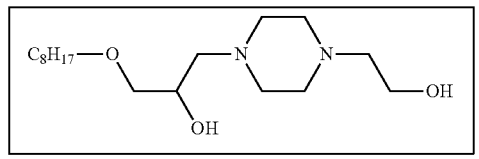

Synthesis of Piperazine Compound 7

28.4 g of C12 and C13 mixed alcohol glycidyl ether (Epogosey (trade name) EN, available from Yokkaichi Chemical Company, Limited. Mixture of C12 alcohol glycidyl ether and C13 alcohol glycidyl ether) and 13.0 g of 1-(2-hydroxyethyl) piperazine (hydroxyethyl piperazine, available from NIPPON NYUKAZAI CO., LTD.) were reacted under conditions of 60° C. to obtain the piperazine compound 7 represented by the following Formula (R represents —C$_{12}$H$_{25}$ or —C$_{13}$H$_{27}$. The piperazine compound 7 is a mixture of the piperazine compound in which R is —C$_{12}$H$_{25}$ and the piperazine compound in which R is —C$_{13}$H$_{27}$).

Piperazine compound 7

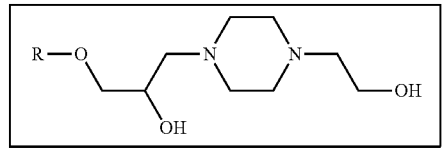

Synthesis of Piperazine Compound 8

56.8 g of C12 and C13 mixed alcohol glycidyl ether (Epogosey (trade name) EN, available from Yokkaichi Chemical Company, Limited.) and 19.04 g of piperazine hexahydrate (piperazine hexahydrate, available from NIPPON NYUKAZAI CO., LTD.) were reacted in ethanol for 6 hours under conditions of 60° C. The reaction solution was washed with saturated saline, extracted with ethyl acetate, and dehydrated with anhydrous magnesium sulfate. Anhydrous magnesium sulfate was filtered off and concentrated to obtain piperazine compound 8 (R each independently represents —C$_{12}$H$_{25}$ or —C$_{13}$H$_{27}$) represented by the following Formula.

Piperazine compound 8

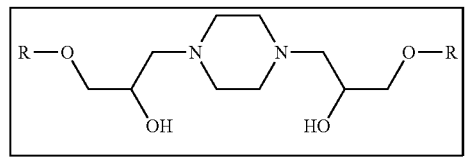

(Comparative) Synthesis of Diazabicyclooctane Compound

After charging 0.15 mol of 1-chloroheptane, 0.18 mol of 1,4-diazabicyclo [2.2.2] octane (DABCO) and 400 mL of acetone, the reaction mixture is heated at a reflux temperature for 24 hours.

Acetone was removed from a reaction product under reduced pressure to obtain oil.

The obtained oil was washed with diethyl ether and then dried under reduced pressure to obtain a diazabicyclooctane compound having a 7C alkyl group.

Synthesis of Morpholine Compound 1

33.3 g of 1-bromooctadecane (available from Tokyo Chemical Industry Co., Ltd.) and 8.7 g of morpholine (available from Tokyo Chemical Industry Co., Ltd.) were reacted in tetrahydrofuran and dichloromethane at room temperature for 1 hour.

A reaction solution was washed with an aqueous potassium carbonate solution, extracted with dichloromethane, and dehydrated with anhydrous magnesium sulfate. Anhydrous magnesium sulfate was filtered off and concentrated to obtain morpholine compound 1 (the following structure).

Morpholine compound 1

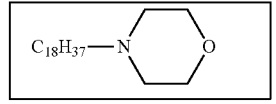

Synthesis of Morpholine Compound 2

30.3 g of stearoyl chloride (available from Tokyo Chemical Industry Co., Ltd.), 8.7 g of morpholine (available from Tokyo Chemical Industry Co., Ltd.), and 15.2 g of triethylamine were reacted in toluene for 1 hour under conditions of 0° C.

A reaction solution was washed with an aqueous sodium carbonate solution, extracted with toluene, and dehydrated with anhydrous magnesium sulfate.

Anhydrous magnesium sulfate was filtered off and concentrated to obtain morpholine compound 2 (the following structure).

Morpholine compound 2

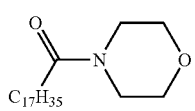

Synthesis of Morpholine Compound 3

18.5 g of 2-ethylhexyl glycidyl ether (Epogosey (trade name) 2EH, available from Yokkaichi Chemical Company, Limited.) and 8.7 g of morpholine (available from Tokyo Chemical Industry Co., Ltd.) were reacted for 4 hours in conditions of 60° C. to obtain morpholine compound 3.

Morpholine compound 3

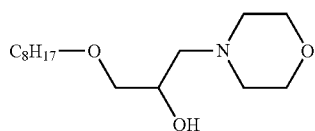

Synthesis of Morpholine Compound 4

28.4 g of a C12 and C13 mixed alcohol glycidyl ether (Epogosey (trade name) EN, available from Yokkaichi Chemical Company, Limited.) and 8.7 g of morpholine (available from Tokyo Chemical Industry Co., Ltd.) were reacted for 4 hours under conditions of 60° C. to obtain morpholine compound 4 (R is —$C_{12}H_{25}$ or —$C_{13}H_{27}$) represented by the following Formula. The morpholine compound 4 is a mixture of the morpholine compound in which R is —$C_{12}H_{25}$ and the morpholine compound in which R is —$C_{13}H_{27}$).

Morpholine compound 4

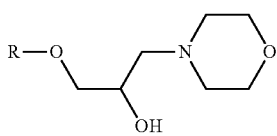

Synthesis of Comparative Morpholine Compound 1

27.8 g of 3-glycidoxypropyltriethoxysilane (KBE-403, available from Shin-Etsu Chemical Co., Ltd.) and 8.7 g of morpholine (available from Tokyo Chemical Industry Co., Ltd.) were reacted for 4 hours in conditions of 60° C. to obtain a comparative morpholine compound 1.

Comparative Morpholine Compound 1

Structure

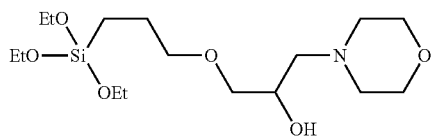

Production of Composition

Each of the components shown in each of the following Tables was blended in the amounts (part by mass) shown in the Table to produce a rubber composition. Specifically, first, among the components shown in each of the following Tables, components other than sulfur and vulcanization accelerators 1 and 2 were mixed in a Banbury mixer to obtain a mixture. Next, the sulfur and the vulcanization accelerators 1 and 2 were added to the mixture by using a roll to obtain the rubber composition.

Evaluation

The following evaluations were performed using the composition produced as described below. The results are shown in each Table.

The results of each evaluation in Table 1 or Table 4 was represented by an index where the result of Standard Example 1 is 100.

The results of each evaluation in Table 2 was represented by an index where the result of Standard Example 2 is 100.

The results of each evaluation in Table 3 was represented by an index where the result of Standard Example 3 is 100.

Mooney Viscosity

For the composition (unvulcanized) produced as described above, according to JIS K6300-1: 2013, Mooney viscosity was measured using an L-shaped rotor under the conditions that the preheating time is 1 minute, the rotation time of the rotor is 4 minutes, and the test temperature is 100° C.

A smaller index indicates lower the viscosity and better workability.

Mooney Scorch

For the composition (unvulcanized) produced as described above, according to JIS K6300-1: 2013, a scorch time was measured using the L-shaped rotor under conditions that a test temperature is 125° C.

In an embodiment of the present technology, when the Mooney scorch index is from 90 to 105, the scorch time is long, the scorch resistance is superior, and the workability is superior.

TABLE 1

| | Standard Example 1 | Example 1 | Example 2 | Example 3 | Example 4 |
|---|---|---|---|---|---|
| SBR *1 | 110.0 | 110.0 | 110.0 | 110.0 | 110.0 |
| BR *2 | 20.0 | 20.0 | 20.0 | 20.0 | 20.0 |
| Silica 1 *3 | 90.0 | 90.0 | 90.0 | 90.0 | 90.0 |
| Carbon black *4 | 5.0 | 5.0 | 5.0 | 5.0 | 5.0 |
| Silane coupling agent *5 | 7.2 | 7.2 | 7.2 | 7.2 | 7.2 |
| Zinc oxide *6 | 3.0 | 3.0 | 3.0 | 3.0 | 3.0 |
| Stearic acid *7 | 2.0 | 2.0 | 2.0 | 2.0 | 2.0 |
| Anti-aging agent *8 | 1.5 | 1.5 | 1.5 | 1.5 | 1.5 |
| Process oil *9 | 20.0 | 20.0 | 20.0 | 20.0 | 20.0 |
| Piperazine compound 1 *10 | | 4.5 | | | |
| Piperazine compound 2 *11 | | | 4.5 | | |
| Piperazine compound 3 *12 | | | | 4.5 | |
| Piperazine compound 4 *13 | | | | | 4.5 |
| Piperazine compound 5 *14 | | | | | |
| Piperazine compound 6 *15 | | | | | |
| Piperazine compound 7 *16 | | | | | |
| Piperazine compound 8 *17 | | | | | |
| (Comparative) Piperazine compound 9 *18 | | | | | |
| (Comparative) Piperazine compound 10 *19 | | | | | |
| (Comparative) Diazabicyclooctane compound | | | | | |
| Sulfur *20 | 1.4 | 1.4 | 1.4 | 1.4 | 1.4 |
| Vulcanization accelerator 1 *21 | 1.7 | 1.7 | 1.7 | 1.7 | 1.7 |

TABLE 1-continued

| | | | | | |
|---|---|---|---|---|---|
| Vulcanization accelerator 2 *22 | 0.4 | 0.4 | 0.4 | 0.4 | 0.4 |
| Mooney viscosity | 100 | 91 | 90 | 95 | 93 |
| Mooney scorch | 100 | 95 | 99 | 100 | 97 |

| | Example | | | | |
|---|---|---|---|---|---|
| | 5 | 6 | 7 | 8 | 9 |
| SBR *1 | 110.0 | 110.0 | 110.0 | 110.0 | 110.0 |
| BR *2 | 20.0 | 20.0 | 20.0 | 20.0 | 20.0 |
| Silica 1 *3 | 90.0 | 90.0 | 90.0 | 90.0 | 90.0 |
| Carbon black *4 | 5.0 | 5.0 | 5.0 | 5.0 | 5.0 |
| Silane coupling agent *5 | 7.2 | 7.2 | 7.2 | 7.2 | |
| Zinc oxide *6 | 3.0 | 3.0 | 3.0 | 3.0 | 3.0 |
| Stearic acid *7 | 2.0 | 2.0 | 2.0 | 2.0 | 2.0 |
| Anti-aging agent *8 | 1.5 | 1.5 | 1.5 | 1.5 | 1.5 |
| Process oil *9 | 20.0 | 20.0 | 20.0 | 20.0 | 20.0 |
| Piperazine compound 1 *10 | | | | | 11.7 |
| Piperazine compound 2 *11 | | | | | |
| Piperazine compound 3 *12 | | | | | |
| Piperazine compound 4 *13 | | | | | |
| Piperazine compound 5 *14 | 4.5 | | | | |
| Piperazine compound 6 *15 | | 4.5 | | | |
| Piperazine compound 7 *16 | | | 4.5 | | |
| Piperazine compound 8 *17 | | | | 4.5 | |
| (Comparative) Piperazine compound 9 *18 | | | | | |
| (Comparative) Piperazine compound 10 *19 | | | | | |
| (Comparative) Diazabicyclooctane compound | | | | | |
| Sulfur *20 | 1.4 | 1.4 | 1.4 | 1.4 | 1.4 |
| Vulcanization accelerator 1 *21 | 1.7 | 1.7 | 1.7 | 1.7 | 1.7 |
| Vulcanization accelerator 2 *22 | 0.4 | 0.4 | 0.4 | 0.4 | 0.4 |
| Mooney viscosity | 93 | 92 | 93 | 93 | 95 |
| Mooney scorch | 102 | 96 | 94 | 101 | 102 |

| | Comparative Example | | | |
|---|---|---|---|---|
| | 1 | 2 | 3 | 4 |
| SBR *1 | 110.0 | 110.0 | 110.0 | 110.0 |
| BR *2 | 20.0 | 20.0 | 20.0 | 20.0 |
| Silica 1 *3 | 90.0 | 90.0 | 90.0 | 90.0 |
| Carbon black *4 | 5.0 | 5.0 | 5.0 | 5.0 |
| Silane coupling agent *5 | 11.7 | 7.2 | 7.2 | 7.2 |
| Zinc oxide *6 | 3.0 | 3.0 | 3.0 | 3.0 |
| Stearic acid *7 | 2.0 | 2.0 | 2.0 | 2.0 |
| Anti-aging agent *8 | 1.5 | 1.5 | 1.5 | 1.5 |
| Process oil *9 | 20.0 | 20.0 | 20.0 | 20.0 |
| Piperazine compound 1 *10 | | | | |
| Piperazine compound 2 *11 | | | | |
| Piperazine compound 3 *12 | | | | |
| Piperazine compound 4 *13 | | | | |
| Piperazine compound 5 *14 | | | | |
| Piperazine compound 6 *15 | | | | |
| Piperazine compound 7 *16 | | | | |
| Piperazine compound 8 *17 | | | | |
| (Comparative) Piperazine compound 9 *18 | | 4.5 | | |
| (Comparative) Piperazine compound 10 *19 | | | 4.5 | |
| (Comparative) Diazabicyclooctane compound | | | | 4.5 |
| Sulfur *20 | 1.4 | 1.4 | 1.4 | 1.4 |
| Vulcanization accelerator 1 *21 | 1.7 | 1.7 | 1.7 | 1.7 |
| Vulcanization accelerator 2 *22 | 0.4 | 0.4 | 0.4 | 0.4 |
| Mooney viscosity | 91 | 97 | 110 | 107 |
| Mooney scorch | 67 | 82 | 53 | 23 |

TABLE 2

| | Standard Example 2 | Example 10 | Example 11 | Example 12 |
|---|---|---|---|---|
| SBR *1 | 110.0 | 110.0 | 110.0 | 110.0 |
| BR *2 | 20.0 | 20.0 | 20.0 | 20.0 |
| Silica 2 *23 | 90.0 | 90.0 | 90.0 | 90.0 |
| Carbon black *4 | 5.0 | 5.0 | 5.0 | 5.0 |
| Silane coupling agent *5 | 7.2 | 7.2 | 7.2 | 7.2 |
| Zinc oxide *6 | 3.0 | 3.0 | 3.0 | 3.0 |
| Stearic acid *7 | 2.0 | 2.0 | 2.0 | 2.0 |
| Anti-aging agent *8 | 1.5 | 1.5 | 1.5 | 1.5 |
| Process oil *9 | 20.0 | 20.0 | 20.0 | 20.0 |
| Piperazine compound 1 *10 | | 1.8 | 7.2 | 12.6 |
| Sulfur *20 | 1.4 | 1.4 | 1.4 | 1.4 |
| Vulcanization accelerator 1 *21 | 1.7 | 1.7 | 1.7 | 1.7 |
| Vulcanization accelerator 2 *22 | 0.4 | 0.4 | 0.4 | 0.4 |
| Mooney viscosity | 100 | 94 | 90 | 87 |
| Mooney scorch | 100 | 98 | 96 | 93 |

TABLE 3

| | Standard Example 3 | Example 13 |
|---|---|---|
| SBR *1 | 110.0 | 110.0 |
| BR *2 | 20.0 | 20.0 |
| Silica 2 *23 | 120.0 | 120.0 |
| Carbon black *4 | 5.0 | 5.0 |
| Silane coupling agent *5 | 9.6 | 9.6 |
| Zinc oxide *6 | 3.0 | 3.0 |
| Stearic acid *7 | 2.0 | 2.0 |
| Anti-aging agent *8 | 1.5 | 1.5 |
| Process oil *9 | 20.0 | 20.0 |
| Piperazine compound 1 *10 | | 9.6 |
| Sulfur *20 | 1.4 | 1.4 |
| Vulcanization accelerator 1 *21 | 1.7 | 1.7 |
| Vulcanization accelerator 2 *22 | 0.4 | 0.4 |
| Mooney viscosity | 100 | 88 |
| Mooney scorch | 100 | 99 |

TABLE 4

| | Standard Example 1 | Example | | | | |
|---|---|---|---|---|---|---|
| | | 1 | 2 | 3 | 4 | 5 |
| SBR *1 | 110.0 | 110.0 | 110.0 | 110.0 | 110.0 | 110.0 |
| BR *2 | 20.0 | 20.0 | 20.0 | 20.0 | 20.0 | 20.0 |
| Silica 1 *3 | 90.0 | 90.0 | 90.0 | 90.0 | 90.0 | 90.0 |
| Carbon black *4 | 5.0 | 5.0 | 5.0 | 5.0 | 5.0 | 5.0 |
| Silane coupling agent *5 | 7.2 | 7.2 | 7.2 | 7.2 | 7.2 | |
| Zinc oxide *6 | 3.0 | 3.0 | 3.0 | 3.0 | 3.0 | 3.0 |
| Stearic acid *7 | 2.0 | 2.0 | 2.0 | 2.0 | 2.0 | 2.0 |
| Anti-aging agent *8 | 1.5 | 1.5 | 1.5 | 1.5 | 1.5 | 1.5 |
| Process oil *9 | 20.0 | 20.0 | 20.0 | 20.0 | 20.0 | 20.0 |
| Morpholine compound 1 | | 3.6 | | | | 10.8 |
| Morpholine compound 2 | | | 3.6 | | | |
| Morpholine compound 3 | | | | 3.6 | | |
| Morpholine compound 4 | | | | | 3.6 | |
| Comparative morpholine compound 1 (silicon-containing) | | | | | | |
| Comparative morpholine compound 2 | | | | | | |
| (Comparative) Diazabicyclooctane compound | | | | | | |
| Sulfur *20 | 1.4 | 1.4 | 1.4 | 1.4 | 1.4 | 1.4 |
| Vulcanization accelerator 1 *21 | 1.7 | 1.7 | 1.7 | 1.7 | 1.7 | 1.7 |
| Vulcanization accelerator 2 *22 | 0.4 | 0.4 | 0.4 | 0.4 | 0.4 | 0.4 |
| Mooney viscosity | 100 | 94 | 91 | 91 | 92 | 90 |
| Mooney scorch | 100 | 95 | 96 | 93 | 94 | 92 |

TABLE 4-continued

|  | Comparative Example | | | |
|---|---|---|---|---|
|  | 1 | 2 | 3 | 4 |
| SBR *1 | 110.0 | 110.0 | 110.0 | 110.0 |
| BR *2 | 20.0 | 20.0 | 20.0 | 20.0 |
| Silica 1 *3 | 90.0 | 90.0 | 90.0 | 90.0 |
| Carbon black *4 | 5.0 | 5.0 | 5.0 | 5.0 |
| Silane coupling agent *5 | 10.8 | 7.2 | 7.2 | 7.2 |
| Zinc oxide *6 | 3.0 | 3.0 | 3.0 | 3.0 |
| Stearic acid *7 | 2.0 | 2.0 | 2.0 | 2.0 |
| Anti-aging agent *8 | 1.5 | 1.5 | 1.5 | 1.5 |
| Process oil *9 | 20.0 | 20.0 | 20.0 | 20.0 |
| Morpholine compound 1 |  |  |  |  |
| Morpholine compound 2 |  |  |  |  |
| Morpholine compound 3 |  |  |  |  |
| Morpholine compound 4 |  |  |  |  |
| Comparative morpholine compound 1 (silicon-containing) |  | 3.6 |  |  |
| Comparative morpholine compound 2 |  |  |  | 3.6 |
| (Comparative) Diazabicyclooctane compound |  |  | 3.6 |  |
| Sulfur *20 | 1.4 | 1.4 | 1.4 | 1.4 |
| Vulcanization accelerator 1 *21 | 1.7 | 1.7 | 1.7 | 1.7 |
| Vulcanization accelerator 2 *22 | 0.4 | 0.4 | 0.4 | 0.4 |
| Mooney viscosity | 95 | 103 | 106 | 102 |
| Mooney scorch | 71 | 62 | 31 | 52 |

The details of each component shown in each table are as follows.

*1: SBR (Tufdene 3830, available from Asahi Kasei Corporation. oil extender content=37.5 parts by mass per 100 parts by mass of SBR), styrene butadiene rubber

*2: BR (Nipol BR1220, available from Zeon Corporation.), butadiene rubber

*3: Silica 1 (Zeosil 1165MP, available from Rhodia Ltd., BET specific surface area=165 $m^2/g$)

*23: Silica 2 (Ultrasil 9000 GR, available from Evonik Japan Ltd., BET specific surface area 235 $m^2/g$)

*4: Carbon black (Show Black N339, available from Cabot Corporation, nitrogen adsorption specific surface area (N2SA)=90 $m^2/g$)

*5: Silane coupling agent (Si69, available from Evonik Degussa; bis (3-triethoxysilylpropyl)tetrasulfide)

*6: Zinc oxide (Zinc Oxide III, available from SEIDO CHEMICAL INDUSTRY CO., LTD.)

*7: Stearic acid (Stearic acid YR, available from NOF CORPORATION)

*8: Anti-aging agent (Santoflex 6PPD, available from Solutia Europe)

*9: Process oil (Extract No. 4 S, available from Showa Shell Sekiyu K.K.)

*10: Piperazine compound 1 (piperazine compound 1 synthesized as described above)

*11: Piperazine compound 2 (piperazine compound 2 synthesized as described above)

*12: Piperazine compound 3 (piperazine compound 3 synthesized as described above)

*13: Piperazine compound 4 (piperazine compound 4 synthesized as described above)

*14: Piperazine compound 5 (piperazine compound 5 synthesized as described above)

*15: Piperazine compound 6 (piperazine compound 6 synthesized as described above)

*16: Piperazine compound 7 (piperazine compound 7 synthesized as described above)

*17: Piperazine compound 8 (piperazine compound 8 synthesized as described above)

*18: (Comparative) Piperazine compound 9 (hydroxyethyl piperazine, available from NIPPON NYUKAZAI CO., LTD.) 1-(2-hydroxyethyl) piperazine

*19: (Comparative) Piperazine compound 10 (reagent [3-(1-piperazinyl) propyl] triethoxysilane)

(Comparative) Diazabicyclooctane compound: (diazabicyclooctane compound synthesized as described above)

Morpholine compound 1 (morpholine compound 1 synthesized as described above)

Morpholine compound 2 (morpholine compound 2 synthesized as described above)

Morpholine compound 3 (morpholine compound 3 synthesized as described above)

Morpholine compound 4 (morpholine compound 4 synthesized as described above)

Comparative morpholine compound 1 (comparative morpholine compound 1 having a silicon atom synthesized as described above)

Comparative morpholine compound 2: Methyl morpholine (available from Tokyo Chemical Industry Co., Ltd.)

*20: Sulfur (sulfur treated with oil, available from Karuizawa Refinery Co., Ltd.)

*21: Vulcanization accelerator 1 (NOCCELER CZ-G, available from OUCHI SHINKO CHEMICAL INDUSTRIAL CO., LTD.)

*22: Vulcanization accelerator 2 (Perkacit DPG, available from Flexsys Inc.)

As apparent from the results shown in Tables 1 to 3, Comparative Example 1 which does not contain a predetermined heterocyclic compound had the short scorch time and the bad workability.

The Comparative Example 2 which does not contain the predetermined heterocyclic compound and contains the piperazine compound which has a hydroxyethyl group had the short scorch time and the bad workability.

The Comparative Example 3 which does not contain the predetermined heterocyclic compound but, instead, contains the piperazine compound which has a silicon atom had the short scorch time, the Mooney viscosity higher than that of Standard Example 1, and the bad workability.

The Comparative Example 4 which does not contain the predetermined heterocyclic compound but, instead, contains the diazabicyclooctane compound had the short scorch time, the Mooney viscosity higher than that of Standard Example 1, and the bad workability.

On the other hand, as shown in Tables 1 to 3, the rubber composition according to an embodiment of the present technology had the Mooney viscosity lower than that of Standard Examples shown in each table, the scorch time in an appropriate range, and the superior workability.

Next, referring to Table 4, Comparative Example 1 which does not contain the predetermined heterocyclic compound had the short scorch time and the bad workability.

The Comparative Example 2 which does not contain the predetermined heterocyclic compound but, instead, contains the piperazine compound which has a silicon atom had the short scorch time, the Mooney viscosity higher than that of Standard Example 1, and the bad workability.

The Comparative Example 3 which does not contain the predetermined heterocyclic compound but, instead, contains the diazabicyclooctane compound had the short scorch time, the Mooney viscosity higher than that of Standard Example 1, and the bad workability.

The Comparative Example 4 which does not contain the predetermined heterocyclic compound but, instead, contains methyl morpholine had the short scorch time, the Mooney viscosity higher than that of Standard Example 1, and the bad workability.

On the other hand, as shown in Table 4, the rubber composition according to an embodiment of the present technology had the Mooney viscosity lower than that of Standard Example 1, the scorch time in an appropriate range, and the superior workability.

The invention claimed is:

1. A rubber composition comprising:
a diene rubber;
silica; and
a heterocyclic compound (where, the heterocyclic compound does not have a silicon atom) which has a hydrocarbon group having from 8 to 30 carbons and at least one type of heterocycle selected from the group consisting of a piperazine ring, a morpholine ring, and a thiomorpholine ring,
a content of the silica being from 50 to 200 parts by mass per 100 parts by mass of the diene rubber, and
a content of the heterocyclic compound being from 0.5 to 20% by mass with respect to the content of the silica,
wherein the heterocyclic compound is represented by Formula (I):

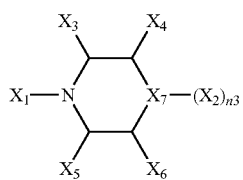

(I)

in Formula (I), $X_7$ represents a nitrogen atom, an oxygen atom or a sulfur atom, $X_3$, $X_4$, $X_5$, and $X_6$ each independently represent a hydrogen atom or a hydrocarbon group, when $X_7$ is a nitrogen atom, n3 is 1, and one or both of $X_1$ and $X_2$ each independently represent Formula (I-1):-$(A_1)_{n1-1}$—$R_{1-1}$, when only one of $X_1$ and $X_2$ represents Formula (I-1), the remaining groups represent at least one type selected from the group consisting of a hydrogen atom, a sulfone-based protecting group, a carbamate-based protecting group, and Formula (I-3):—$(R_2$—$O)_{n2}$—H, in Formula (I-3), $R_2$ each independently represents a divalent hydrocarbon group, n2 represents from 1 to 10, when $X_7$ is an oxygen atom or a sulfur atom, n3 represents 0, and $X_1$ represents Formula (I-1):-$(A_1)_{n1-1}$—$R_{1-1}$, in Formula (I-1), $A_1$ represents a carbonyl group and/or Formula (I-2): —$R_{1-2}$(OH)—O—, n1-1 represents 0 or 1, $R_{1-1}$ represents the hydrocarbon group having from 8 to 30 carbons, and in Formula (I-2), $R_{1-2}$ represents a trivalent hydrocarbon group.

2. The rubber composition according to claim 1, wherein the heterocyclic compound is a compound represented by Formula (I), where $X_7$ is a nitrogen atom, and n3 is 1, and both of $X_1$ and $X_2$ each independently represent Formula (I-1).

3. The rubber composition according to claim 1, wherein the heterocyclic compound is a compound represented by Formula (I), where $X_7$ is a nitrogen atom, and n3 is 1, only one of $X_1$ and $X_2$ represents Formula (I-1), the remaining groups represent at least one type selected from the group consisting of a hydrogen atom, a sulfone-based protecting group, a carbamate-based protecting group, and Formula (I-3):—$(R_2$—$O)_2$—H, In Formula (I-3), $R_2$ each independently represents a divalent hydrocarbon group, and n2 represents from 1 to 10.

4. The rubber composition according to claim 1, wherein the heterocyclic compound is a compound represented by Formula (I), where $X_7$ is an oxygen atom or a sulfur atom, n3 is 0, and $X_1$ represents Formula (I-1).

5. A pneumatic tire comprising the rubber composition described in claim 1.

* * * * *